(12) United States Patent
Lee et al.

(10) Patent No.: US 9,623,400 B2
(45) Date of Patent: Apr. 18, 2017

(54) CATALYST FOR PRODUCING HYDROGEN AND PREPARING METHOD THEREOF

(71) Applicant: National Chiao Tung University, Hsinchu (TW)

(72) Inventors: Chi-Shen Lee, Hsinchu (TW);
Ping-Wen Tsai, Hsinchu (TW);
Ho-Chen Hsieh, Hsinchu (TW);
Yun-Sheng Chen, Hsinchu (TW);
Yuan-Chia Chang, Hsinchu (TW);
Sheng-Feng Weng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 21 days.

(21) Appl. No.: 14/851,452

(22) Filed: Sep. 11, 2015

(65) Prior Publication Data
US 2016/0220984 A1    Aug. 4, 2016

(30) Foreign Application Priority Data

Feb. 3, 2015    (TW) .............................. 104103530 A

(51) Int. Cl.
| | | |
|---|---|---|
| *B01J 23/63* | (2006.01) | |
| *B01J 23/00* | (2006.01) | |
| *B01J 37/08* | (2006.01) | |
| B01J 23/04 | (2006.01) | |
| B01J 23/02 | (2006.01) | |
| B01J 23/10 | (2006.01) | |

(52) U.S. Cl.
CPC ............. *B01J 23/63* (2013.01); *B01J 23/002* (2013.01); *B01J 37/08* (2013.01); B01J 23/02 (2013.01); B01J 23/04 (2013.01); B01J 23/10 (2013.01)

(58) Field of Classification Search
CPC . B01J 23/63; B01J 23/002; B01J 37/08; B01J 23/10; B01J 23/02; B01J 23/04
See application file for complete search history.

(56) References Cited

U.S. PATENT DOCUMENTS 8,133,463 B1 *    3/2012    Berry .................... B01J 23/002
252/373

OTHER PUBLICATIONS

Andonova S., et al. "Structure and redox properties of Co promoted Ni/Al2O3 catalysts for oxidative steam reforming of ehtanol", Applied Catalysis B: Environmental. vol. 105, pp. 346-360. 2011.
Deluga, G.A. et al., "Renewable Hydrogen from Ethanol by Autothermal Reforming", Science, vol. 303, pp. 993-997. 2004.

* cited by examiner

*Primary Examiner* — Kaj K Olsen
*Assistant Examiner* — James Fiorito
(74) *Attorney, Agent, or Firm* — Mintz Levin Cohn Ferris Glovsky and Popeo, P.C.; Peter F. Corless; Richard B. Emmons

(57) ABSTRACT

The present invention provides a catalyst for producing hydrogen and a preparing method thereof. The method includes the steps of adding a first metal source, a second metal source, a third metal source and a cerium source into a first organic solvent containing a surfactant to form a colloidal mixture, wherein a metal of the first metal source is a Group IIIB metal; a metal of the second metal source is selected from the group consisting of alkali metals, alkaline earth metals and Group IIIB metals, and a metal of the third metal source is a transition metal; calcining the colloidal mixture to form a metal solid solution; and allowing the metal solid solution to be carried on a carrier to obtain the catalyst. When the catalyst of the present invention is used for an ethanol oxidation reformation, the reaction temperature of the ethanol oxidation reformation can be significantly decreased. After the catalyst is used for long periods of time, the ethanol oxidation reformation still has high ethanol conversion ratio and hydrogen selection ratio.

7 Claims, 9 Drawing Sheets

CATALYST FOR PRODUCING HYDROGEN AND PREPARING METHOD THEREOF

CROSS-REFERENCES TO RELATED APPLICATIONS

This application claims under 35 U.S.C. §119(a) the benefit of Taiwanese Application No. 104103530, filed Feb. 3, 2015 the entire contents of which are incorporated herein by reference.

BACKGROUND OF THE INVENTION

1. Field of the Invention

The present invention relates to catalysts and methods for preparing the catalysts and, more particularly, to a catalyst for producing hydrogen and a method for preparing the same.

2. Description of Related Art

Energy is indispensable in our daily life. About 80% of energy relies on combustion of fossil fuels, so the generated carbon dioxide and greenhouse gases result in global warming. To solve the issue of environmental pollution, it is urgent to find a renewable, clean and sustainable new energy to replace the fossil fuels.

Hydrogen is an excellent energy carrier because it is an alternative energy with high electrical energy conversion efficiency. Heat quantity for combustion of per kilogram of hydrogen is about 3 times of that of gasoline and 4.5 times of that of coke. The product of reacting hydrogen with oxygen is produced in the form of water and produces low-pollution for the environment. However, a volume energy density of hydrogen is low. To increase the energy density per unit volume, biofuels can be used to produce hydrogen. Furthermore, expensive freight of hydrogen leads scientists to choose appropriate hydrogen sources as fuels of the new energy sources. At present, alternative hydrogen sources including hydrocarbon such as methanol, ethanol, natural gas and light oil are used. Among these, ethanol has many advantages such as higher fuel quality, cheap price, easy access, easy storage, easy portability and higher energy density. Furthermore, ethanol can produce hydrogen at lower reaction temperature. As compared to the conventional gasoline, the generated carbon dioxide is reduced by approximately 50% and the air pollutant such as nitrogen oxide, sulfur oxide and hydrocarbon will not be produced.

Current technologies for converting ethanol into hydrogen include steam reforming of ethanol (SRE), partial oxidation of ethanol (POE), oxidative steam reforming of ethanol (OSRE) and others. Over the past decade, scientists have focused on the research that SRE can be operated at lower temperature. The chemical reaction equation for SRE is as follows.

$$C_2H_5OH + 3H_2O \rightarrow 2CO_2 + 6H_2 \quad \Delta H^\circ_{298} = +347.4 \text{ kJ/mol}$$

The SRE reaction belongs to a reaction having highest yield of hydrogen. However, since SRE is an endothermic reaction, the operation temperature is still high. In contrast, OSRE is an exothermic reaction and can react at relatively lower temperature, so it has become the research emphasis in the industry. The chemical reaction equation for OSRE is as follows.

$$C_2H_5OH + \tfrac{1}{2}O_2 + 2H_2O \rightarrow 2CO_2 + 5H_2 \quad \Delta HR = -68 \text{ kJ/mol}$$

According to previous studies, it is known that metals are used as a catalyst for the catalytic reaction of hydrogen. The most commonly used catalysts are used by placing noble metals with high activities on the oxides carriers. The noble metals include rhodium (Rh), ruthenium (Ru), platinum (Pt), palladium (Pd), iridium (Ir) and the like. The oxides carriers include aluminum oxide ($Al_2O_3$), magnesium oxide (MgO), lanthanum oxide ($La_2O_3$), silicon dioxide ($SiO_2$) and the like. However, the temperature of the catalytic conversion is mostly higher than 500° C. which increases the fracture between carbon and carbon as well as generate byproducts deposited on the catalyst surface. Thus, loss of the catalytic activity requires higher production costs.

Schmidt et al., in Science, 2004, 303, 993-997, have reported a steam autothermal reforming reaction of ethanol. This study has proposed that 5% of $Rh$—$CeO_2$—$Al_2O_3$ was used as catalyst for converting ethanol into hydrogen and also used a two-stage catalytic experiment. In the second stage, platinum-cerium dioxide (Pt—$CeO_2$) was used as catalyst. However, the contents of rhodium and platinum are too high, and precious rhodium and platinum will increase production costs. The reaction temperature of the two-stage catalytic experiment being over 400° C. also results in the byproducts deposited on the catalyst surface and the activity loss of the catalyst. In addition, Andonova et al., in Applied Catalysis B: Environmental, 2011, 105, 346-360, indicated that when cobalt was added to nickel-aluminum oxide (Ni—$Al_2O_3$), and the hydrogen selection ratio was increased in the bimetallic effect at the optimal content of 6 wt % of cobalt and 10 wt % of nickel. Although the use of nickel can reduce the cost of the catalyst, such catalyst was demanded to react at high temperature of 500° C. The high temperature will increase the fracture between carbons and generate byproducts such as $CO_2$, $C_2H_4$ and $CH_3CHO$ deposited on the catalyst surface and lose the catalyst activity. Thus, the catalysts proposed in the studies do not meet the market demand.

Therefore, it is urgent to develop a catalyst whose catalyst activity can be maintained under the condition of the lower temperature of the ethanol oxidation reformation, solve the situation of the carbon deposition, and reduce the content of noble metal in the catalyst for reducing the production costs.

SUMMARY OF THE INVENTION

The present invention provides a preparing method of a catalyst for producing hydrogen, comprising the steps of:

adding a first metal source, a second metal source, a third metal source and a cerium source into a first organic solvent containing a surfactant, and stirring the first organic solvent to form a colloidal mixture, wherein a metal of the first metal source is a Group IIIB metal, a metal of the second metal source is selected from the group consisting of alkali metals, alkaline earth metals and Group IIIB metals, the first metal source is different from the second metal source, and the third metal source is a transition metal and is exclusive from a Group IIIB metal or lanthanides;

calcining the colloidal mixture to form a metal solid solution, dispersing the metal solid solution in a second organic solvent containing a carrier, and allowing the metal solid solution be carried on the carrier; and removing the second organic solvent to obtain the catalyst.

The present invention further provides a catalyst for producing hydrogen. The catalyst comprises a carrier and a metal solid solution represented by formula (I), and the metal solid solution is formed on the carrier, $$(A_{2-x}A'_x)(Ce_yB_{2-y})O_{7-\delta} \qquad (I)$$

wherein A is selected from one of Group IIIB metals; A' is selected from the group consisting of alkali metals, alkaline earth metals and metals of Group IIIB; A is different from A'; B is a transition metal, and B is exclusive from a Group IIIB metal or lanthanides; x is 0.1 to 1.0; y is 1.8 to 1.9; and δ is greater than 0 to 0.5.

From the foregoing description, the preparing method of a catalyst for producing hydrogen of the present invention reduces the usage amount of noble metals. It can increase the activity of the catalyst, lower the reaction temperature of the ethanol oxidative reformation and reduce the generation of the byproducts such as $CO_2$, $C_2H_4$ and $CH_3CHO$ by doping metals in the different positions and compositions through $(A_{2-x}A'_x)(Ce_yB_{2-y})O_{7-\delta}$ as the main structure of the novel catalyst. Thus, the catalyst has stability for prolonged use and enables the ethanol oxidative reformation to have high ethanol conversion ratio and hydrogen selection ratio.

DETAILED DESCRIPTION OF THE PREFERRED EMBODIMENTS

Figure 1:
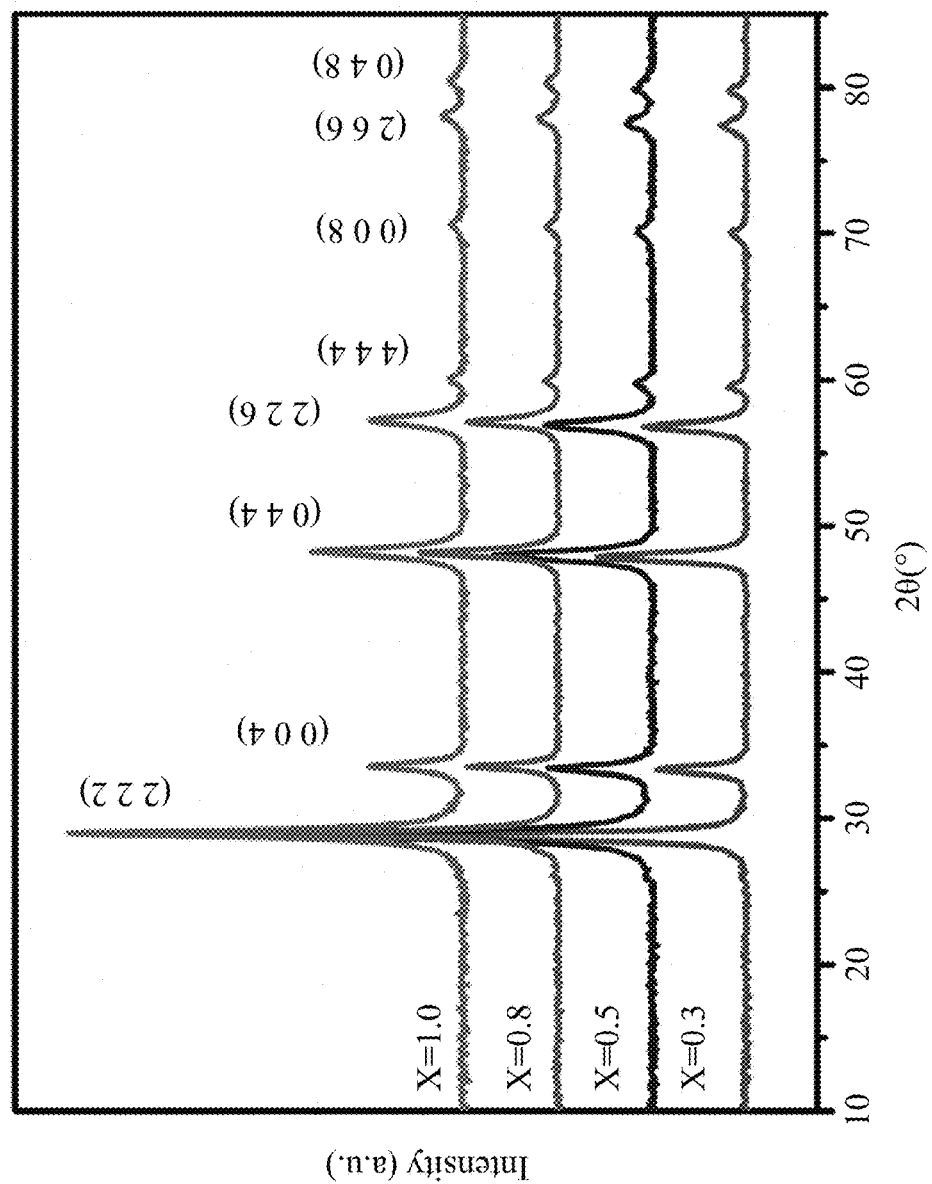
FIG. 1 shows X-ray diffraction pattern of $Y_{2-x}Sc_xCe_yRu_{2-y}O_{7-\delta}$ as catalyst according to the present invention.

The following specific examples are used for illustrating the present invention. A person skilled in the art can easily conceive the other advantages and effects of the present invention.

For ease of presentation, the third metal source specifically indicated herein is not a Group IIIB metal or lanthanides in Group IIIB The present invention develops the pyrochlore structure $A_2B_2O_7$ as host materials of the catalyst. Such structure can reduce the content of the noble metals by doping alkali metals and alkali earth metals in the position of A. Furthermore, the use of the catalyst in the ethanol oxidative reformation can promote the reaction temperature to be significantly reduced. After reacting for long periods of time, the high selection ratio of hydrogen can be maintained and it conforms to the need of the industry.

In the preparing method of a catalyst for producing hydrogen of the present invention, a metal solid solution is prepared according to a sol-gel method. First of all, a first metal source, a second metal source, a third metal source and cerium source are added into a first organic solvent containing a surfactant. Subsequently, stirring the first organic solvent to form a colloidal mixture, wherein a metal of the first metal source is a Group IIIB metal; a metal of the second metal source is selected from the group consisting of alkali metals, alkaline earth metals and Group IIIB metals, the first metal source is different from the second metal source, and a metal of the third metal source is a transition metal and is exclusive from a Group IIIB metal or lanthanides.

In the above method, the amount of the surfactant is not specifically limited. In one embodiment, relative to 5 grams (g) of the first organic solvent, the amount of the surfactant is from 0.25 to 1.0 g, preferably 0.5 g. The example of the surfactant includes, but is not limited to, P123, F68, F108 and F127. Among these, the chemical formula of P123 is $HO(CH_2CH_2O)_{20}(CH_2CH(CH_3)O)_{70}(CH_2CH_2O)_{20}H$. The first organic solvent is alcohols which can be selected from the group consisting of methanol, ethanol, butanol and isopropanol.

According to the above method, the first metal source, the second metal source, the third metal source and the cerium source are added into the first organic solvent based on the weighed metal nitrates or metal chlorides at different stoichiometry ratio, and the total concentration of the metal ions contained in the formed mixture is about 5 mmol After stirring, a colloidal mixture is formed. In one embodiment, after stirring for at least 1 hour, the mixture is gelled at 40° C. for three days to form the colloidal mixture.

Furthermore, in one embodiment, the metal of the first metal source is selected from scandium, yttrium or lanthanum. The metal of the second metal source is selected from the group consisting of alkali metals, alkaline earth metals, and Group IIIB metal. More specifically, the metal of the second metal source is selected from alkali metals, alkaline earth metals, scandium, yttrium or lanthanum. The metal of the third metal source is a transition metal and is not a Group IIIB metal or lanthanides. For example, the metal of the third metal source is selected from the group consisting of ruthenium, osmium, rhodium, iridium and rhenium.

In another embodiment of the present invention, the metal of the second metal source is selected from alkali metals, alkaline earth metals, scandium, yttrium or lanthanum. The metal of the first metal source is a Group IIIB metal. Similarly, the metal of the third metal source is a transition metal and is not a Group IIIB metal or lanthanides. For example, the metal of the third metal source is selected from the group consisting of ruthenium, osmium, rhodium, iridium and rhenium.

After that, a calcination step is operated according to the conventional method. In a non-limited embodiment, the colloidal mixture is calcined for 1 to 7 hours, preferably 5 hours, to form a metal solid solution, wherein the calcination temperature is from 600° C. to 900° C.

Subsequently, the prepared metal solid solution is dispersed in a second organic solvent. For example, in a non-limited embodiment, relative to the volume of the second organic solvent being not more than 10 mL, the amount of the metal solid solution is 0.1 to 1.0 g, preferably 0.1 g. The second organic solvent is performed an ultrasonic agitation, and then a carrier is immersed in the second organic solvent. The ratio of the carrier and the metal solid solution is 10:1. Finally, the catalyst is obtained by removing the second organic solvent at 80° C. to 100° C.

According to the above method, the second organic solvent is alcohols and it can be selected from the group consisting of methanol, ethanol, butanol and isopropanol.

In addition, the carrier is selected from the non-reactive materials. For example, the carrier is selected from the group consisting of aluminum oxide, magnesium oxide, lanthanum oxide and silicon dioxide. Further, the aluminum oxide can be γ-aluminum oxide.

On the other hand, the catalyst for producing hydrogen prepared by the method of the present invention comprises a carrier and a metal solid solution which is formed on the carrier surface. The metal solid solution is represented by formula (I), $$(A_{2-x}A'_x)(Ce_yB_{2-y})O_{7-\delta} \qquad (I)$$

wherein A is selected from one of Group IIIB metals; A' is selected from the group consisting of alkali metals, alkaline earth metals and Group IIIB metals, and A is different from A'; B is a transition metal, and is exclusive from a Group IIIB metal or lanthanides; x is 0.1 to 1.0; y is 1.8 to 1.9; and δ is greater than 0 to 0.5.

In addition, the δ value is changed with the valence number of the transition metals. Therefore, the catalyst has the δ value greater than 0 to 0.5 and the 6 value is not fixed.

According to the catalyst for producing hydrogen, the carrier is selected from the group consisting of aluminum oxide, magnesium oxide, lanthanum oxide and silicon dioxide. Further, the aluminum oxide can be γ-aluminum oxide.

In addition, in one embodiment of A is selected from scandium, yttrium or lanthanum, and A' is selected from alkali metals, alkaline earth metals, scandium, yttrium or lanthanum. B is selected from the group consisting of ruthenium, osmium, rhodium, iridium and rhenium.

Furthermore, the alkali metal is lithium, or the alkaline earth metal is selected from magnesium or calcium.

In one embodiment, A is lanthanum, A' is lithium, and B is ruthenium. Further, in one embodiment, A is lanthanum, A' is magnesium or calcium, and B is ruthenium. In another embodiment, when A' is magnesium or calcium, x is 0.1 to 0.5.

In one embodiment, A is yttrium, A' is scandium, and B is ruthenium.

EXAMPLES

The following specific examples are used for illustrating the present invention. A person skilled in the art can easily conceive the other advantages and effects of the present invention.

Synthetic Example 1

Preparation for $Y_{2-x}Sc_xCe_yRu_{2-y}O_{7-\delta}$ as Catalyst

According to the preparing method of a catalyst for producing hydrogen of the present invention, P123 (0.5 g) was dissolved in ethanol (5 g), and then yttrium nitrate hexahydrate ($Y(NO_3)_3 \cdot 6H_2O$, 0.25 mole), scandium nitrate hydrate ($Sc(NO_3)_3 H_2O$, 0.25 mole), cerium nitrate hexahydrate ($Ce(NO_3)_3 \cdot 6H_2O$, 0.475 mole) and ruthenium chloride with multi-crystalline water (($RuCl_3 \cdot XH_2O$, 0.025 mole) were added into ethanol. After ultrasonic agitation and stirring for at least 1 hour, the mixture was gelled at 40° C. for three days to form a colloidal mixture. Subsequently, the colloidal mixture was calcined at 600° C. to 900° C. for 5 hours, and the surfactant was removed to obtain a metal solid solution.

The metal solid solution (0.05 g) was dispersed in ethanol (3 mL to 10 mL) and added γ-aluminum oxide (Corundum; 18 mesh, 1 g, $S_{BET}$>300 m²/g, 0.5 g) followed by ultrasonic agitation. Finally, the second organic solvent was removed at 90° C. and the above processes were repeated at least 5 times to allow the metal solid solution to completely disperse on γ-aluminum oxide. Thus, $Y_{1.0}Sc_{1.0}Ce_{1.9}Ru_{0.1}O_{7-\delta}$ as catalyst with x being 1.0 and y being 1.9 was obtained.

Besides, the catalysts with x being 0.8, 0.5 and 0.3 and y being 1.9 were prepared respectively based on the weighed stoichiometric amount. Afterwards, an ethanol conversion ratio and hydrogen selection ratio were tested.

Synthetic Example 2

Preparation for $La_{2-x}Mg_xCe_yRu_{2-y}O_{7-\delta}$ as Catalyst

The catalyst was prepared in the same manner as stated in Synthetic example 1, expect that lanthanum nitrate (0.375 mole), magnesium nitrate hexahydrate ($Mg(NO_3)_2 \cdot 6H_2O$, 0.125 mole), cerium nitrate hexahydrate (0.45 mole) and ruthenium chloride (0.05 mole) were used as the metal sources. Thus, $La_{1.5}Mg_{0.5}Ce_{1.8}Ru_{0.2}O_{7-\delta}$ as catalyst with x being 0.5 and y being 1.8 was obtained.

Besides, the catalysts with x being 0.4, 0.3, 0.2 and 0.1 and y being 1.8 were prepared respectively based on the weighed stoichiometric amount. Afterwards, an ethanol conversion ratio and hydrogen selection ratio were tested.

Synthetic Example 3

Preparation for $La_{2-x}Ca_xCe_yRu_{2-y}O_{7-\delta}$ as Catalyst

The catalyst was prepared in the same manner as stated in Synthetic example 1, expect that lanthanum nitrate (0.375 mole), calcium nitrate tetrahydrate ($Ca(NO_3)_2 \cdot 4H_2O$, 0.125 mole), cerium nitrate hexahydrate (0.45 mole) and ruthenium chloride (0.05 mole) were used as the metal sources. Thus, $La_{1.5}Ca_{0.5}Ce_{1.8}RU_{0.2}O_{7-\delta}$ as catalyst with x being 0.5 and y being 1.8 was obtained.

Besides, the catalysts with x being 0.4, 0.3, 0.2 and 0.1 and y being 1.8 were prepared respectively based on the weighed stoichiometric amount. Afterwards, an ethanol conversion ratio and hydrogen selection ratio were tested.

Synthetic Example 4

Preparation for $La_{2-x}Li_xCe_yRu_{2-y}O_{7-\delta}$ as Catalyst

The catalyst was prepared in the same manner as stated in Synthetic example 1, expect that lanthanum nitrate (0.35 mole), lithium nitrate ($LiNO_3$, 0.15 mole), cerium nitrate hexahydrate (0.45 mole) and ruthenium chloride (0.05 mole) were used as the metal sources. Thus, $La_{1.4}Li_{0.6}Ce_{1.8}Ru_{0.2}O_{7-\delta}$ as catalyst with x being 0.6 and y being 1.8 was obtained. Afterwards, an ethanol conversion ratio and hydrogen selection ratio were tested.

Besides, the catalysts with x being 0.8, 0.7, 0.5, 0.4, 0.3, 0.2 and 0.1 and y being 1.8 were prepared respectively based on the weighed stoichiometric amount. Afterwards, an ethanol conversion ratio and hydrogen selection ratio were tested.

Test Example 1

$Y_{2-x}Sc_xCe_yRu_{2-y}O_{7-\delta}$ as catalyst prepared in Synthetic example 1 in which x is 1.0, 0.8, 0.5, 0.3 and y is 1.9 were analyzed by X-ray diffraction patterns. As shown in FIG. 1, all components are pure phase, that is, the preparing method of Synthetic example 1 can obtain $Y_{2-x}Sc_xCe_yRu_{2-y}O_{7-\delta}$ as catalyst with high purity.

Figure 2:
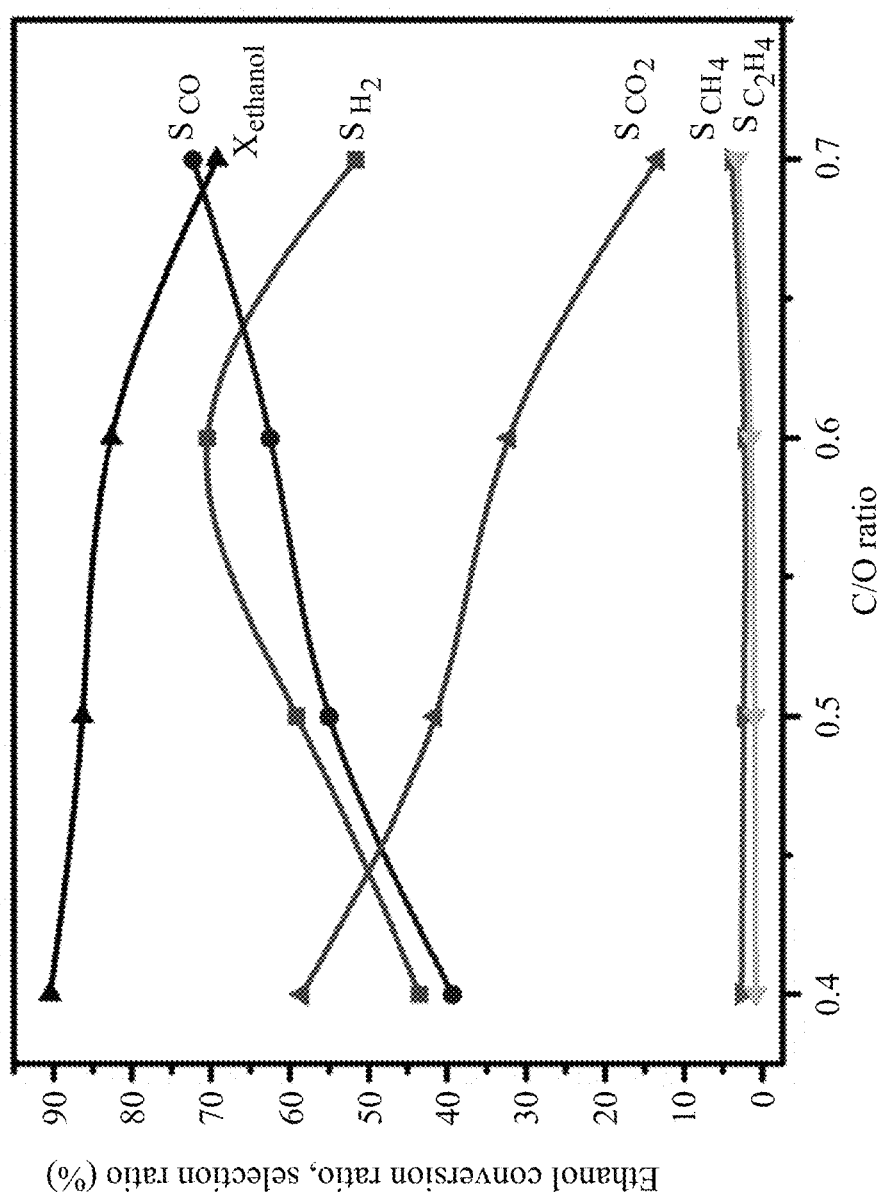
FIG. 2 shows an analysis curve diagram of carbon-to-oxygen ratio of each product by the use of $Y_{1.0}Sc_{1.0}Ce_{1.9}Ru_{0.1}O_{7-\delta}$ as catalyst in an ethanol reformer according to the present invention.

Moreover, for $Y_{1.0}Sc_{1.0}Ce_{1.9}Ru_{0.1}O_{7-\delta}$ as catalyst prepared in Synthetic example 1, a product analysis of the ethanol reformer was performed. The product analysis of the ethanol reformer was performed at a gas hourly space velocity (GHSV) of 160,000 $h^{-1}$, a ethanol/water ratio of 1:3 and a reaction temperature of 270° C. As shown in FIG. 2, when a carbon-to-oxygen ratio is changed, after reacting for 12 hours, it is still maintained at high ethanol conversion ratio. When the carbon-to-oxygen ratio is 0.6, the hydrogen selection ratio is as high as 70%.

Test Example 2

Figure 3:
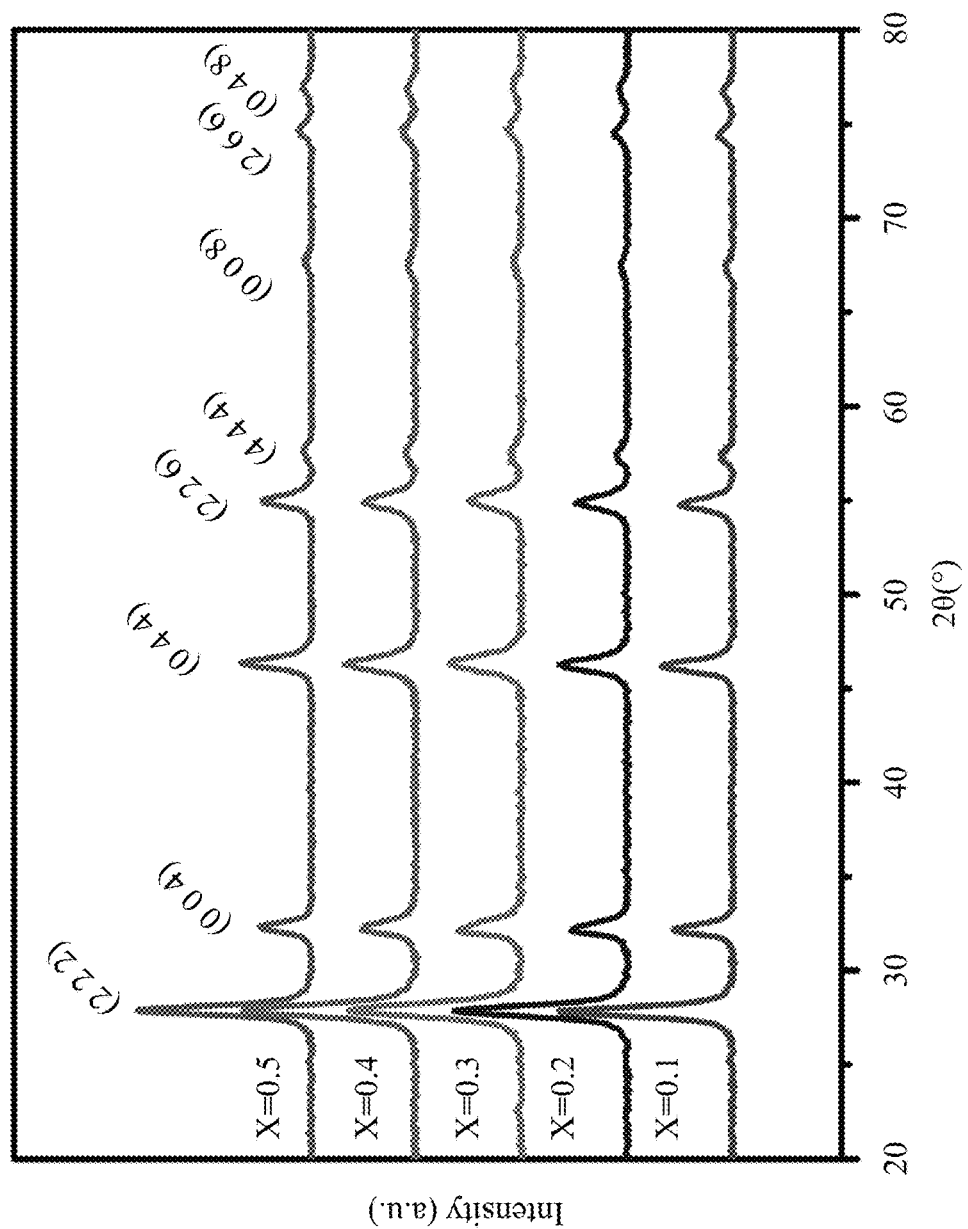
FIG. 3 shows X-ray diffraction pattern of $La_{2-x}Mg_xCe_yRu_{2-y}O_{7-\delta}$ as catalyst according to the present invention.

$La_{2-x}Mg_xCe_yRu_{2-y}O_{7-\delta}$ as catalyst prepared in Synthetic example 2 in which x is 0.5, 0.4, 0.3, 0.2, 0.1 and y is 1.8 were analyzed by X-ray diffraction patterns. As shown in FIG. 3, all components are pure phase, that is, the method of Synthetic example 2 can obtain $La_{2-x}Mg_xCe_yRu_{2-y}O_{7-\delta}$ as catalyst with high purity.

Figure 4:
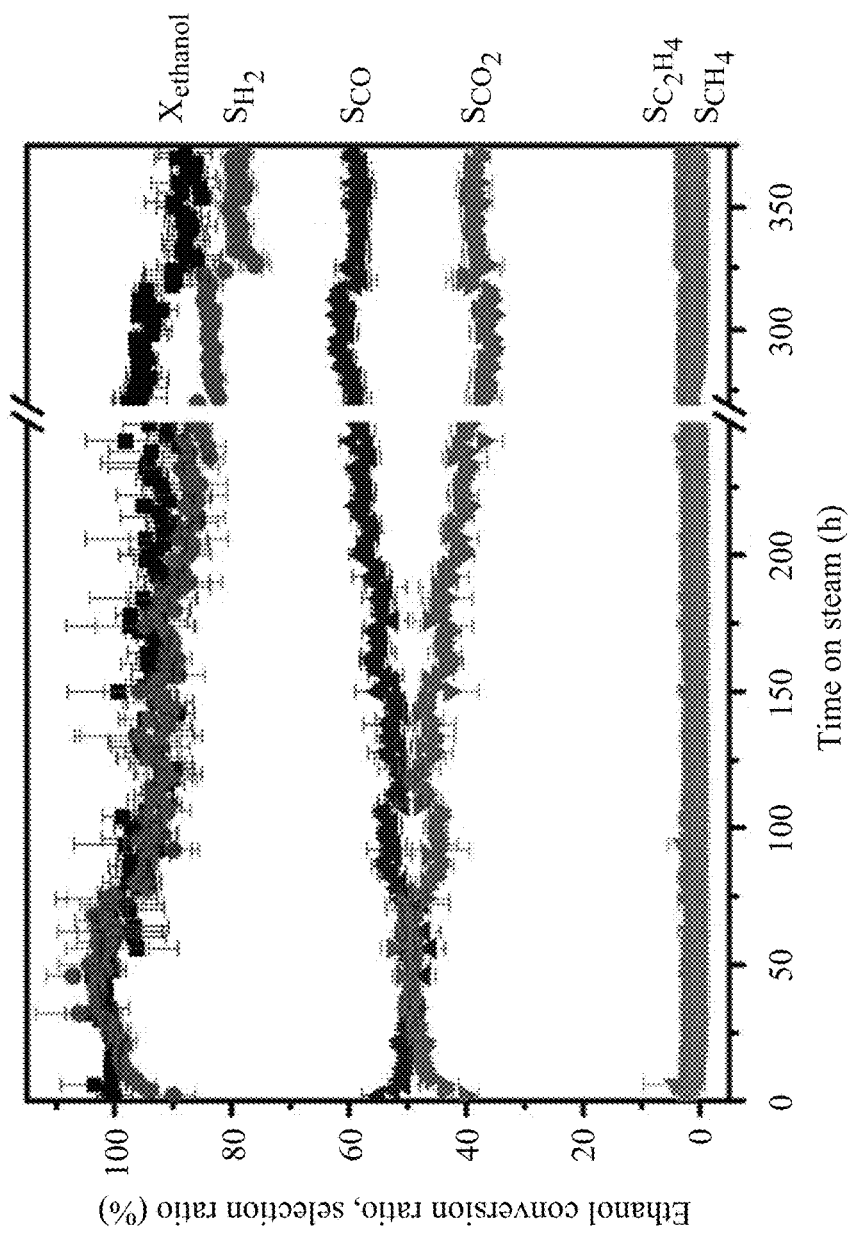
FIG. 4 shows an analysis curve diagram of time-on-steam of each product by the use of $La_{1.7}Mg_{0.3}Ce_{1.8}Ru_{0.2}O_{7-\delta}$ as catalyst in an ethanol reformer according to the present invention.

Moreover, for $La_{1.7}Mg_{0.3}Ce_{1.8}Ru_{0.2}O_{7-\delta}$ as catalyst prepared in Synthetic example 2, a product analysis of the ethanol reformer was performed. The product analysis of the ethanol reformer was performed at the carbon-to-oxygen ratio (C/O ratio) of 0.6, the GHSV of 160,000 $h^{-1}$, ethanol/water ratio of 1:3 and a reaction temperature of 380° C. As shown in FIG. 4, after reacting for a long period of 350 hours, it is still maintained at 100% of ethanol conversion ratio. With regard to the hydrogen selection ratio, the reaction was quenched after reacting for 240 hours. Then, the reaction was restarted after a period of time. After reacting for 50 hours, the catalyst was beginning to stabilize and the hydrogen selection ratio was still around 80%. The result shows that a lifetime of the catalyst is not dramatically reduced after reacting for long periods of times. That is to say, the catalyst does not be affected by the high temperature and does not increase the fracture between carbon and carbon, so as to prevent byproducts deposited on the catalyst surface.

Test Example 3

Figure 5:
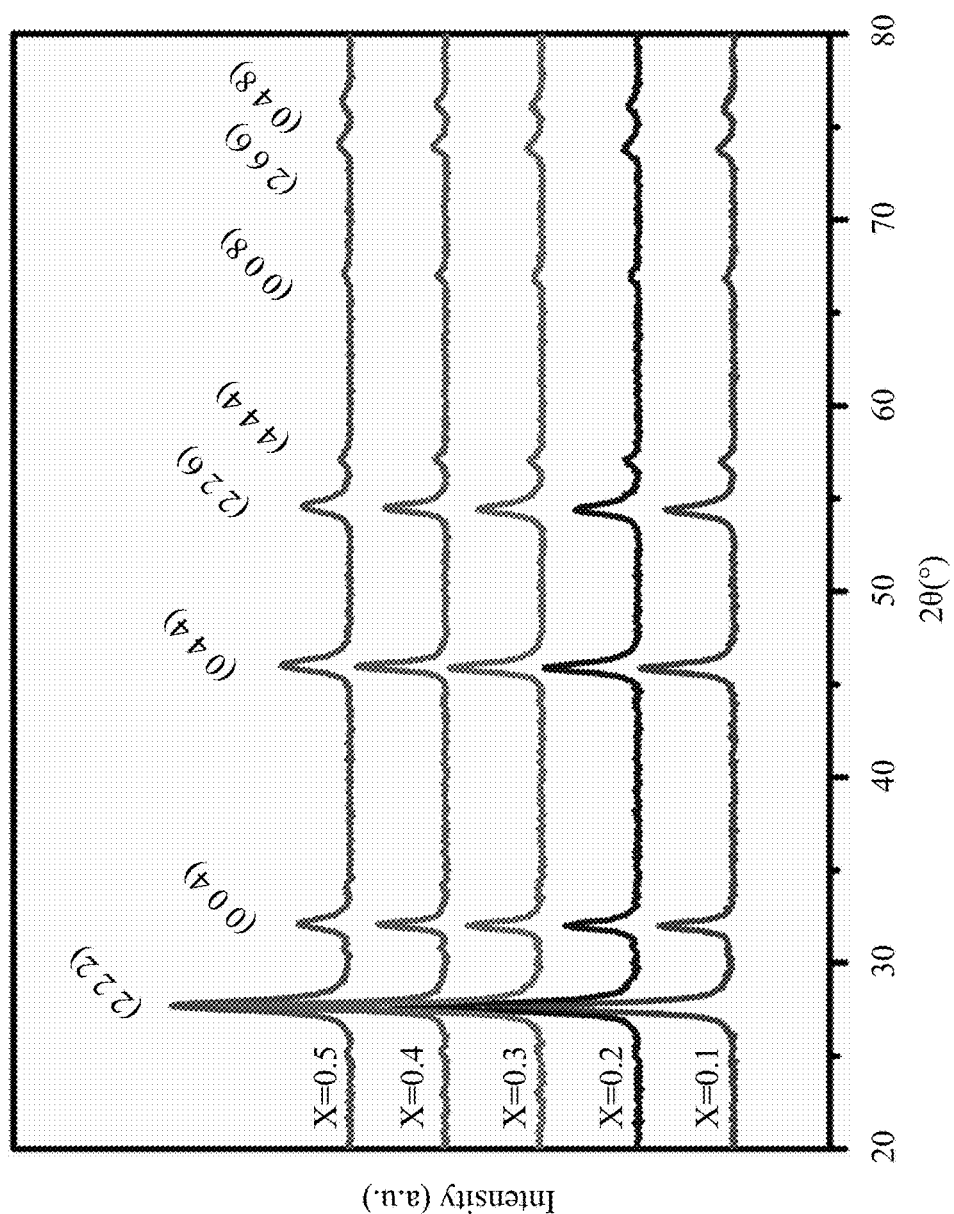
FIG. 5 shows X-ray diffraction pattern of $La_{2-x}Ca_xCe_yRu_{2-y}O_{7-\delta}$ as catalyst according to the present invention.

$La_{2-x}Ca_xCe_yRu_{2-y}O_{7-\delta}$ as catalyst prepared in Synthetic example 3 in which x is 0.5, 0.4, 0.3, 0.2, 0.1 and y is 1.8 were analyzed by X-ray diffraction patterns. As shown in FIG. 5, all components are pure phase, that is, the method of Synthetic example 3 can obtain $La_{2-x}Ca_xCe_yRu_{2-y}O_{7-\delta}$ as catalyst with high purity.

Figure 6:
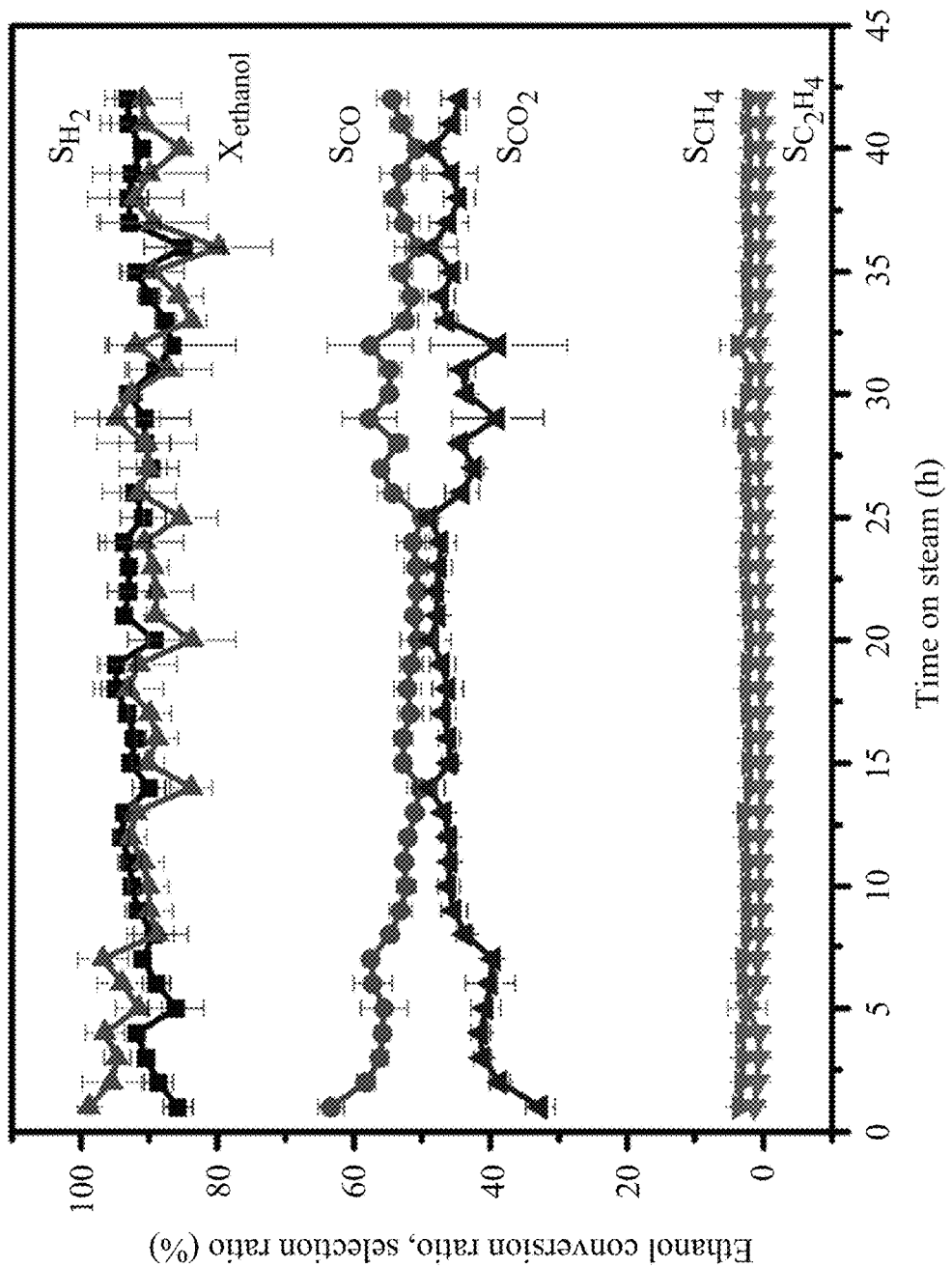
FIG. 6 shows an analysis curve diagram of time-on-steam of each product by the use of $La_{1.8}Ca_{0.2}Ce_{1.8}Ru_{0.2}O_{7-\delta}$ as catalyst in an ethanol reformer according to the present invention.

Moreover, for $La_{1.8}Ca_{0.2}Ce_{1.8}Ru_{0.2}O_{7-\delta}$ as catalyst prepared in Synthetic example 3, a product analysis of the ethanol reformer was performed. The product analysis of the ethanol reformer was performed at the C/O ratio of 0.6, ethanol/water ratio of 1:3, the GHSV of 160,000 $h^{-1}$. The reaction was started at 240° C. and was performed at 280° C. As shown in FIG. 6, after reacting for 40 hours, it is still maintained at 90% of ethanol conversion ratio and hydrogen selection ratio.

Test Example 4

Figure 7:
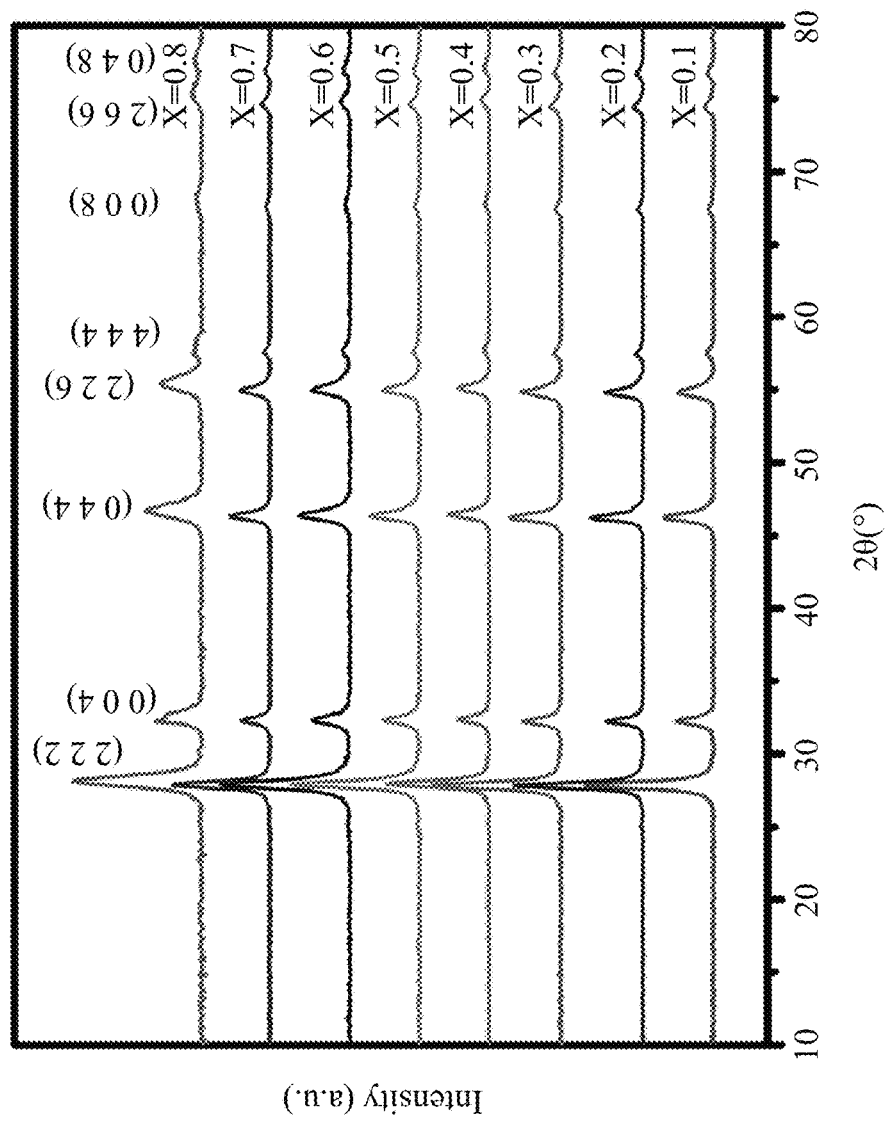
FIG. 7 shows X-ray diffraction pattern of $La_{2-x}Li_xCe_yRu_{2-y}O_{7-\delta}$ as catalyst according to the present invention.

$La_{2-x}Li_xCe_yRu_{2-y}O_{7-\delta}$ as catalyst prepared in Synthetic example 4 in which x is 0.8, 0.7, 0.6, 0.5, 0.4, 0.3, 0.2, 0.1 and y is 1.8 were analyzed by X-ray diffraction patterns. As shown in FIG. 7, all components are pure phase, that is, the method of Synthetic example 4 can obtain $La_{2-x}Li_xCe_yRu_{2-y}O_{7-\delta}$ as catalyst with high purity.

Figure 8:
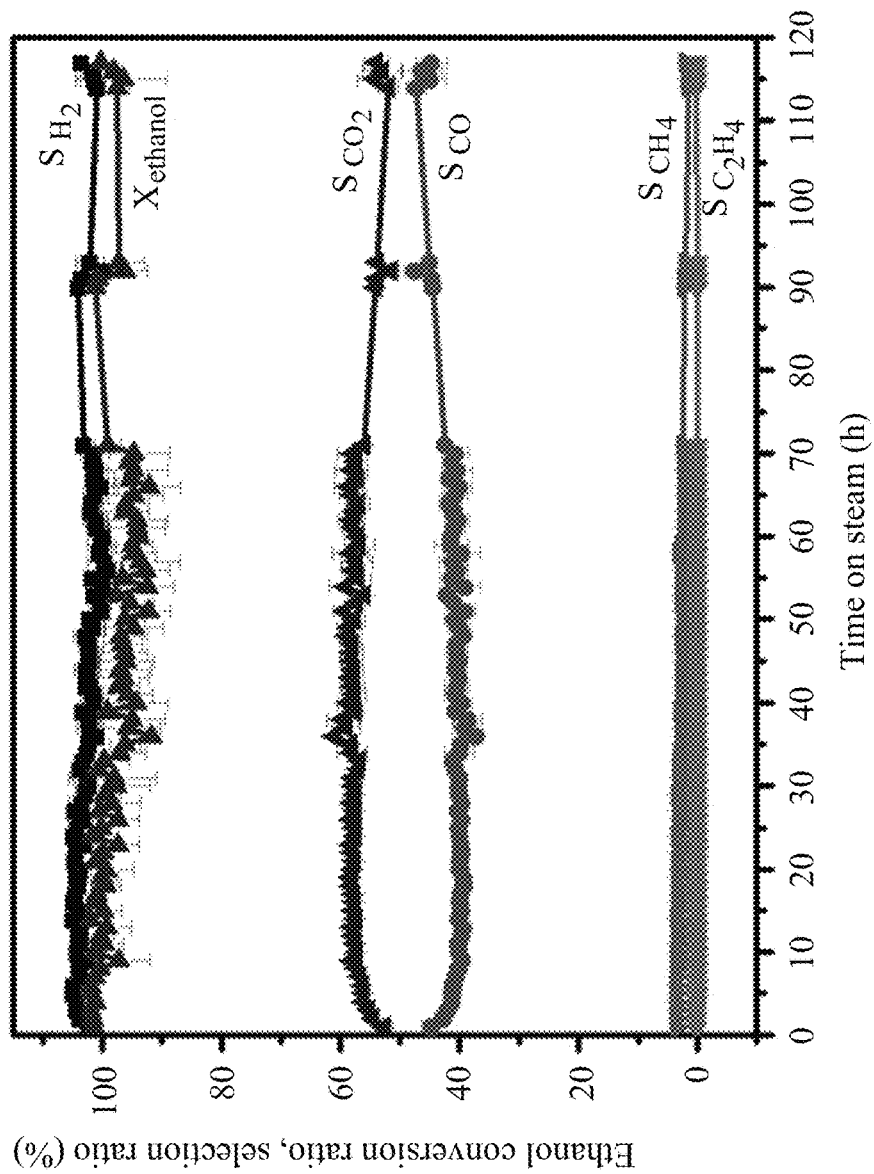
FIG. 8 shows an analysis curve diagram of the product by the use of $La_{1.4}Li_{0.6}Ce_{1.8}Ru_{0.2}O_{7-\delta}$ as catalyst in an ethanol reformer according to the present invention

Moreover, for $La_{1.4}Li_{0.6}Ce_{1.8}Ru_{0.2}O_{7-\delta}$ as catalyst prepared in Synthetic example 4, a product analysis of the ethanol reformer was performed. The product analysis of the ethanol reformer was performed at the GHSV of 160,000 $h^{-1}$, ethanol/water ratio of 1:3. The reaction was started at 260° C. and was performed at 350° C. As shown in FIG. 8, when the C/O ratio is 0.6, after reacting for 120 hours, the ethanol conversion ratio is approximately 100% and the hydrogen selection ratio is approximately 105%.

Figure 9:
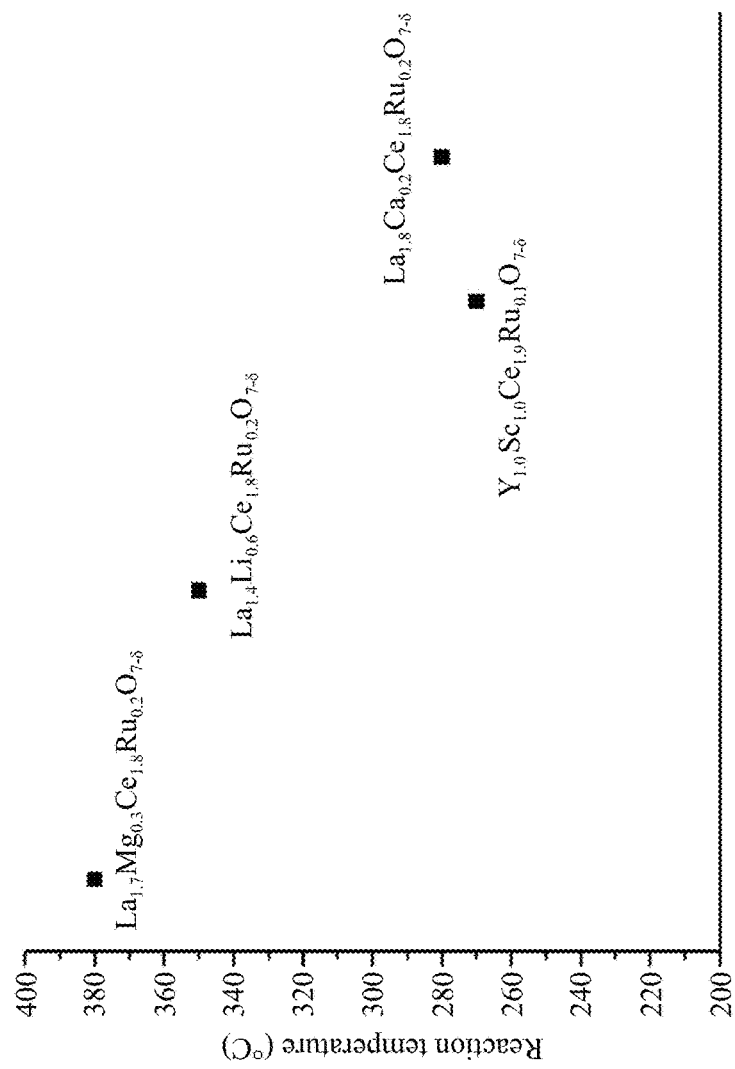
FIG. 9 shows reaction temperature for different catalysts used in an ethanol reformer.

Furthermore, the reaction temperatures for $Y_{1.0}Sc_{1.0}Ce_{1.9}Ru_{0.1}O_{7-\delta}$ of Synthetic example 1, $La_{1.7}Mg_{0.3}Ce_{1.8}Ru_{0.2}O_{7-\delta}$ of Synthetic example 2, $La_{1.8}Ca_{0.2}Ce_{1.8}Ru_{0.2}O_{7-\delta}$ of Synthetic example 3, and $La_{1.4}Li_{0.6}Ce_{1.8}Ru_{0.2}O_{7-\delta}$ of Synthetic example 4 are integrated. As shown in FIG. 9, when the above catalysts are used in the ethanol reformer, all of the reaction temperatures are not over 400° C., so as to avoid generating byproducts deposited on the catalyst surface due to high temperatures as well as avoid the catalysts losing their activities.

In summary, the preparing method of a catalyst for producing hydrogen and the prepared catalyst of the present invention, in the case of avoiding the use of noble metals (such as rhodium and platinum) as well as a relatively low amount of transition metals, can reduce production costs and still maintain a relatively high hydrogen selection ratio. Moreover, when the reaction temperatures of the catalysts are significantly reduced, the byproducts (such as $CO_2$, $C_2H_4$ and $CH_3CHO$) generated from the fracture between carbon and carbon in the reaction can be reduced as well as the carbon deposited on the catalyst surface can be avoided, and then high catalytic activities of the catalysts is still maintained after using the catalysts for long periods of time.

What is claimed is:

1. A catalyst for producing hydrogen, comprising:
   a carrier; and
   a metal solid solution represented by formula (I) and being formed on the carrier, $$(A_{2-x}A'_x)(Ce_yB_{2-y})O_{7-\delta} \tag{I}$$

wherein A is selected from one of Group IIIB metals;
   A' is selected from the group consisting of alkali metals, alkaline earth metals and Group IIIB metals, and A is different from A';
   B is a transition metal and is exclusive from a Group IIIB metal or lanthanides;
   x is 0.1 to 1.0;
   y is 1.8 to 1.9; and
   δ is greater than 0 to 0.5.

2. The catalyst of claim 1, wherein the carrier is selected from the group consisting of aluminum oxide, magnesium oxide, lanthanum oxide and silicon dioxide.

3. The catalyst of claim 1, wherein A is selected from the group consisting of scandium, yttrium, and lanthanum; and A' is selected from the group consisting of alkali metals, alkaline earth metals, scandium, yttrium, and lanthanum.

4. The catalyst of claim 1, wherein A is lanthanum, A' is lithium, and B is ruthenium.

5. The catalyst of claim 1, wherein A is lanthanum, A' is magnesium or calcium, and B is ruthenium.

6. The catalyst of claim 1, wherein A is yttrium, A' is scandium, and B is ruthenium.

7. The catalyst of claim 1, wherein B is selected from the group consisting of ruthenium, osmium, rhodium, iridium and rhenium.